United States Patent [19]

Achelpohl et al.

[11] Patent Number: 5,518,103
[45] Date of Patent: May 21, 1996

[54] APPARATUS FOR ROTATING WORKPIECES FED IN A LAID FLAT POSITION

[75] Inventors: Fritz Achelpohl, Lienen; Hermann Sandmeier, Bielefeld, both of Germany

[73] Assignee: Windmöller & Hölscher, Lengerich/Westf., Germany

[21] Appl. No.: 364,100

[22] Filed: Dec. 27, 1994

[30] Foreign Application Priority Data

Jan. 28, 1994 [DE] Germany ............... 44 02 560.2

[51] Int. Cl.⁶ ................................................. B65G 47/24
[52] U.S. Cl. ............................................. 198/416; 198/415
[58] Field of Search ................................. 198/411, 415, 198/416

[56] References Cited

U.S. PATENT DOCUMENTS

| | | | |
|---|---|---|---|
| 1,341,238 | 5/1920 | Mason | 198/415 |
| 3,321,062 | 5/1967 | Brockmuller et al. | 198/415 |
| 4,085,839 | 4/1978 | Crawford | 198/415 X |
| 4,672,792 | 6/1987 | Wallin | 198/415 X |
| 4,807,739 | 2/1989 | Wolf et al. | 198/415 |
| 5,316,123 | 5/1994 | Achelpohl | 198/416 |

FOREIGN PATENT DOCUMENTS

| | | |
|---|---|---|
| 1436856 | 3/1971 | Germany . |
| 2304642 | 8/1974 | Germany . |
| 2701268 | 7/1977 | Germany . |
| 3702925C2 | 8/1987 | Germany . |
| 4142824A1 | 8/1993 | Germany . |
| 2262726 | 6/1993 | United Kingdom . |

*Primary Examiner*—James R. Bidwell
*Attorney, Agent, or Firm*—Keck, Mahin & Cate

[57] ABSTRACT

An apparatus for rotating workpieces fed in a laid flat position, has a pair of conveyor belts which fixes the respective workpiece eccentrically at one point and moves it forward, and at least one carrier belt that runs parallel to the pair of conveyor belts. To permit a reliable introduction of the rotational movement, at least one suction belt is arranged between the pair of conveyor belts and the carrier belt, using which a part of the workpiece that is spaced from the fixed point can be suctionally attracted.

10 Claims, 3 Drawing Sheets

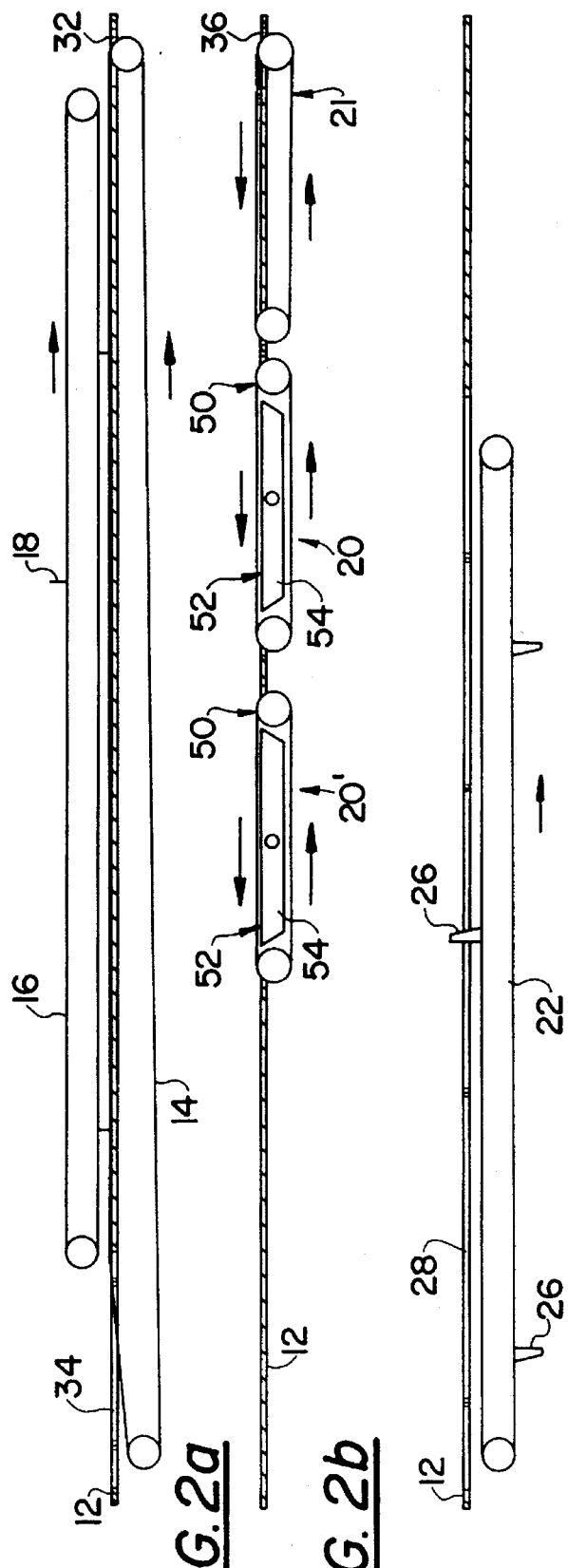

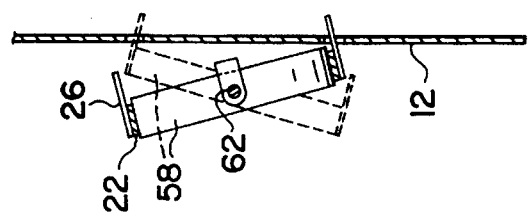
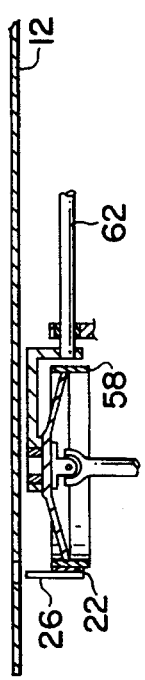
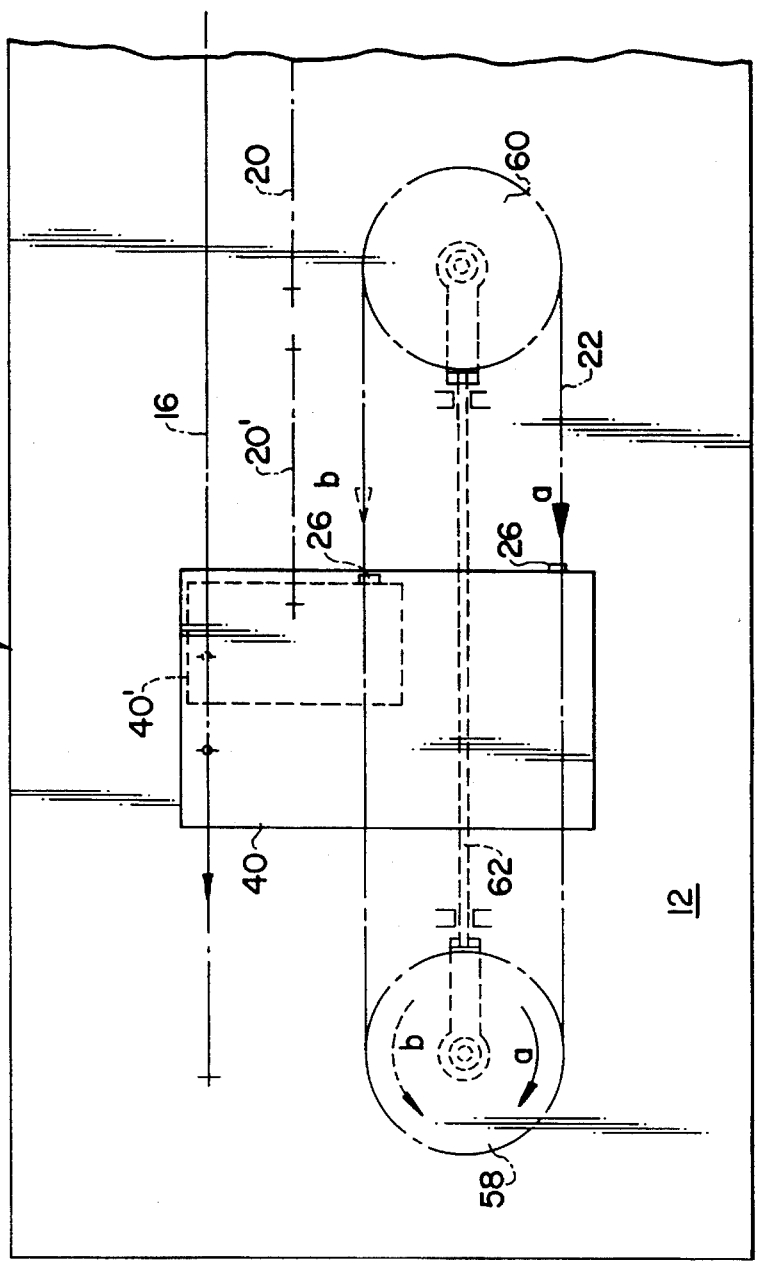

APPARATUS FOR ROTATING WORKPIECES FED IN A LAID FLAT POSITION

FIELD OF THE INVENTION

The invention concerns an apparatus for rotating workpieces fed in a laid flat position, in which a pair of conveyor belts fixes the workpiece eccentrically at one point and moves it forward, and at least one carrier belt runs parallel to the pair of conveyor belts.

PRIOR ART

An apparatus for rotating workpieces fed in a laid flat position has already been known, for example, from DE-A1-2304642. In this known apparatus, the workpieces are seized, near a side edge, on their median line that is parallel to the original conveyance edge, with scope for rotation at this point, and are moved on by frictional engagement with a bearing surface until the completion of a rotation, preferably through 90°, when they move perpendicularly to the original conveyance edge. For this purpose, provision is made for two conveyor chains circulating synchronously in a vertical plane and interspaced from each other with cooperating clamping components that are rotatable around axes perpendicular to the plane of movement, for receiving the workpieces. In this apparatus, the workpieces are fed laterally and are then fixed at their pivoting point. Because of the friction with the bearing surface of the table, the laterally projecting zone of the workpiece lags behind, relative to the pivoting point that has been seized and moved on by the conveyor chains, so that a longitudinal alignment of the workpieces in the conveyance direction is effected. In using this apparatus, a relatively long conveyance path has to be covered for the workpiece fed in a laid flat position to be rotated through 90°.

From DE-C-1436856, an apparatus is known wherein workpieces whose narrower side edge is at first carried as the leading edge, are rotated through 90° in such a way that after passing through the apparatus, it is the wider edge that is carried as the leading edge. According to this prior art, for its onward transport the workpiece is seized in the vicinity of a front corner by means of suitable clamping components of conveyor chains circulating one above the other in a vertical plane. Several conveyor belts run parallel next to the conveyor chains, in an arrangement wherein each of the parallel conveyor belts has a circulating speed that increases with the distance from the conveyor chains. In this way because of the differential velocity the workpieces, held only between the clamping components that are rotatably mounted on the conveyor chains, are simultaneously pivoted during their onward transport, preferably through 90°, so that finally it is the longer side edge that is leading. In this known apparatus each of the conveyor belts, driven at a velocity different from that of the pair of conveyor chains, must be driven relative thereto by a correspondingly complicated gear unit. Such an apparatus is not only complicated but, in addition, requires a high maintenance input and is liable to malfunctions.

Finally, a generic apparatus is known from GB-A-2262726. An apparatus is there described for rotating workpieces fed in a laid flat position, having a pair of conveyor belts which fixes the workpiece eccentrically at one point and moves it forward and, running parallel thereto, a further conveyor belt that is shorter than the pair of conveyor belts. Both the pair of conveyor belts and the parallel conveyor belt are driven over a table or other support surface at the same speed. At least one carrier belt also circulates parallel to the pair of fixing conveyor belts and the further conveyor belt and at the same speed, and seizes the workpiece in its edge zone by means of suitable stops and prevents it from being rotated any further. In practical operation it has been shown that with this known apparatus for certain workpieces to be rotated a satisfactory result has not always been obtained. This means that frequently workpieces fed in a laid flat position have not been rotated to the desired extent after passing through the apparatus.

OBJECT OF THE INVENTION

It is, therefore, an object of the invention to develop further a simple and compact apparatus of the generic kind, in such a way that it permits rotation, to the desired extent with great reliability, of workpieces fed in a laid flat position.

SUMMARY OF THE INVENTION

Accordingly an aspect of the present invention provides an apparatus for rotating workpieces fed in a laid flat position, having: a pair of conveyor belts which fixes the workpiece eccentrically at one point and moves it forward; at least one carrier belt that runs parallel to the pair of conveyor belts; and at least one suction belt, between the pair of conveyor belts and the pair of carrier belts, for suctionally attracting a part of the workpiece that is spaced from said one fixed point.

This stated problem is thus solved in the vacuum that is applied pointwise to the workpiece by the at least one suction belt ensures that the rotation of the workpiece is induced in a positive manner.

It is particularly advantageous if two said suction belts are disposed one after the other in the conveyance direction; while the suction point of the first suction belt leads to a partial rotation of the workpiece being fed in a laid flat position, the constrained rotation of the workpiece fed in a laid flat position is largely completed by means of the suction point of the second suction belt.

In accordance with an advantageous embodiment of the invention a simple short conveyor belt, moved forward at the same speed as the pair of conveyor belts, may be arranged ahead of said at least one suction belt in the workpiece intake zone.

The respective suction belt may consist of an endless conveyor belt, whose upper side runs sealed over a vacuum suction reservoir, and which has suction holes arranged at predetermined intervals in the endless conveyor belt.

In accordance with a further aspect of the invention there is provided an apparatus for rotating workpieces fed in a laid flat position, having: a pair of conveyor belts which fixes the workpiece eccentrically at one point and moves it forward; and at least one carrier belt that runs parallel to the pair of conveyor belts; wherein the at least one carrier belt running below the conveyance plane passes around two guide pulleys which are substantially parallel to the conveyance plane; wherein interspaced stops are provided on the carrier belt; and wherein said guide pulleys are able to be pivoted relative to the conveyance plane in such a way that, depending on the pivotal position of the guide rollers, the stops on the carrier belt project or do not project from the conveyance plane.

With this apparatus it is possible to alter the distance between (i) the stops moving at the conveyance speed and (ii) the pair of conveyor belts, in a simple and effective manner in two stages by a simple pivoting of the guide rollers. The pivoting of the guide rollers may be facilitated in that both are arranged in a pivoting frame.

BRIEF DESCRIPTION OF THE DRAWINGS

Further objects and advantages of the invention will be described in greater detail with reference to examples of the embodiments represented in the accompanying drawings, in which:

FIGS. 2a, 2b and 2c show three sections through the apparatus of FIG. 1, each in the plane of conveyor or carrier belts, FIGS. 3, 3a and 3b respectively, show various views of an alternative embodiment of apparatus of the invention.

DETAILED DESCRIPTION OF THE PREFERRED EMBODIMENT

Figure 1:
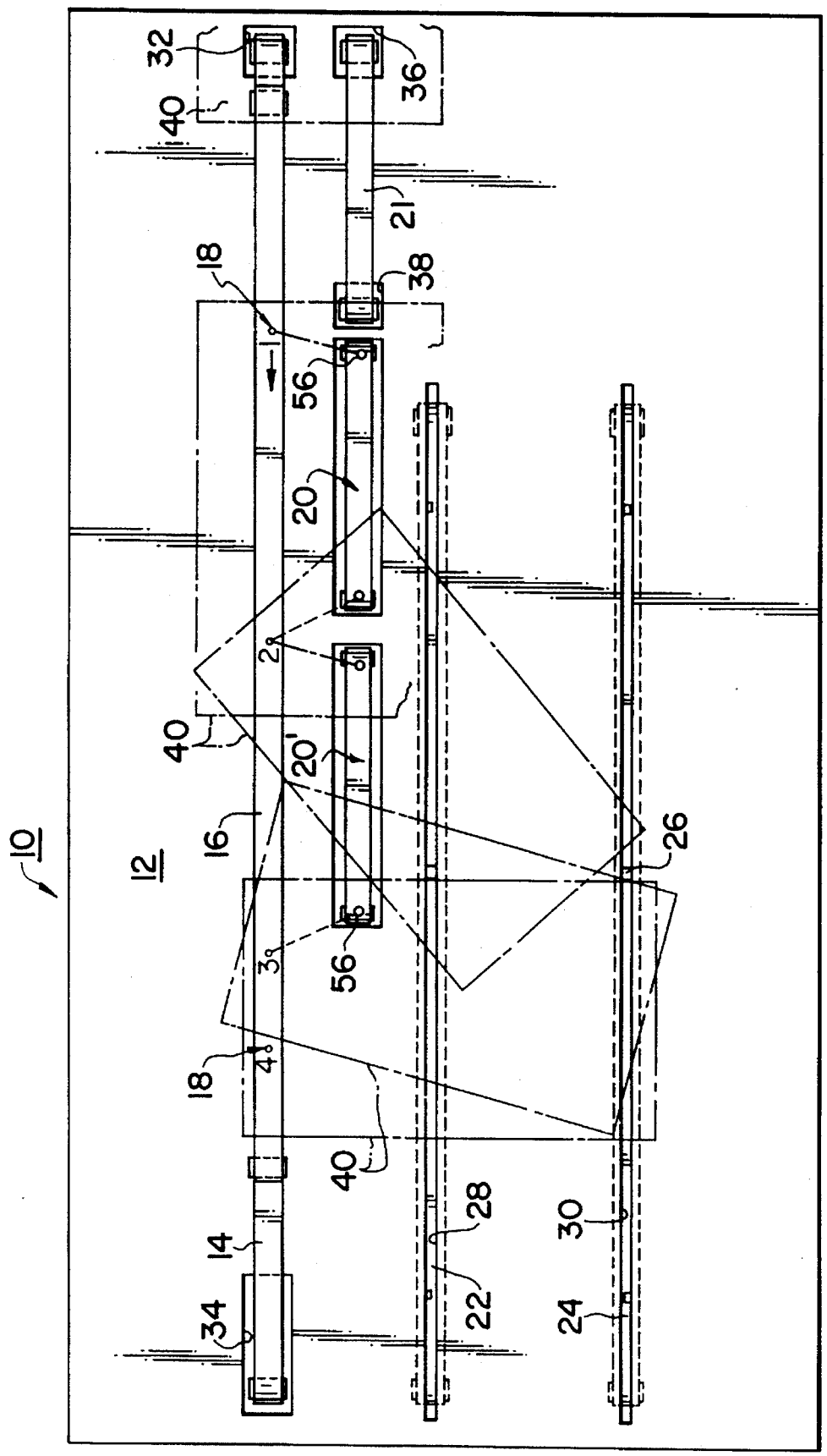
FIG. 1 shows a top view of an embodiment of an apparatus in accordance with the invention.

The apparatus 10 firstly comprises a support table 12 which forms the conveyance plane. Above the table 12 there runs an upper conveyor belt 16 and below the table 12 there runs a conveyor belt 14 whose upper side is guided upwards above the plane of the table 12 through openings 32 and 34. The two conveyor belts 14, 16 run at the same circulation speed.

FIG. 2a clearly shows the arrangement of the pair of conveyor belts 14, 16, and also several clamping pins 18 (which may penetrate the workpieces) arranged at given intervals along the upper conveyor belt 16 at given intervals. The conveyor belts 14, 16 run in the direction of the arrow shown in FIG. 2.

Parallel to, and next to, the pair of conveyor belts 14, 16 a substantially shorter parallel conveyor belt 21 runs starting from the intake zone, at the same conveyance speed. As may be gathered from FIG. 1 and in particular from FIG. 2b, the conveyor belt 21 also runs substantially below the table 12, and again the upper side of the conveyor belt 20 is guided via openings 36 and 38 to above the surface of the table 12.

The short conveyor belt 21 is followed in the conveyance direction of the apparatus 10 by two successive suction belts 20 and 20'. These suction belts 20, 20' each consist of an endless belt 50 whose upper side 52 runs sealed above a vacuum suction plenum 54, and has suction holes 56 arranged in the endless conveyor belt at predetermined intervals therealong. By means of these suction belts 20, 20' a workpiece can be sucked up as long as a suction hole within the upper side of the belt runs along the vacuum suction plenum extending along the upper side. The suction belts 20, 20' run in the direction of the arrow of FIG. 2 at a speed that is slightly slower than that of the pair of conveyor belts 14, 16.

As shown in FIG. 1, two carrier belts 22 and 24 are arranged parallel to, but offset relative to, the pair of conveyor belts 14, 16. The carrier belts 22 and 24 start staggered relative to the pair of conveyor belts 14, 16, but terminate in the same zone of the table 12. The carrier belts 22 and 24 run completely below the table top, but they have at predetermined intervals therealong stops 26 which project above the surface of the table through suitable gaps 28 and 30.

The mode of operation of the apparatus in accordance with the invention may be explained with reference to FIG. 1. A rectangular workpiece 40 preferably in the form of a bag or sack, which is to be rotated from its longitudinal position through 90° into its transverse conveying position, is first conveyed by the pair of aligned conveyor belts 14, 16 and the conveyor belt 21 running beside them and parallel thereto. Both the pair of conveyor belts 14, 16 and the parallel conveyor belt 21 run at the same conveyance speed, so that the workpiece 40 will not be rotated. Near the trailing narrower side edge, the workpiece 40 is eccentrically pinned by the clamping pin 18 of the upper conveyor belt 16 and is therefore fixed at a pivoting point defined thereby. FIG. 1 shows this first conveying stage of the workpiece 40, with the workpiece 40 aligned parallel to the table edges. In this conveyance position, the pivoting point is designated by "1".

After the workpiece 40 has passed beyond the conveyor belt 21, it passes over the suction belt 20 following the conveyor belt 21. There the workpiece 40 is attracted by suction applied by means of the suction hole 56, at a point which is displaced from the point fixed by the clamping pin 18. This displacement is shown in FIG. 1 in the right-hand portion with the chain-dotted line starting from point 1.

The suction belt 20 runs slightly more slowly than the pair of conveyor belts 14, 16, so that the pivoting point of the workpiece defined by the clamping pin 18 runs slightly ahead of the suctionally held point, as has been indicated in FIG. 1 by the point 2 and the associated dashed line. Because of this differential velocity, the workpiece 40 is constrained to rotate round a given angle.

To continue further with the constrained rotation after the suction hole 56 of the suction belt 20 is no longer active, the suction hole 56 of the following suction belt 20' is activated so that the position is obtained that is indicated by the point 2 and the chain-dotted line in FIG. 1.

The suction belt 20' also runs at a slightly slower conveyance speed than the pair of conveyor belts 14, 16. Thus the rotation of the workpiece 40 continues in a constrained manner, and at the end of the suction belt 20' there is obtained the position shown by the point 3 and the dashed line in FIG. 1. The remaining rotation round the piercing tip 18 is effected due to the friction of the workpiece 40 on the support table 12, so that eventually the workpiece 40 has been rotated through 90° round the pivoting point designated as point 4. After the 90° rotation has been completed, the trailing end of the workpiece is finally engaged by the two stops 26 of the conveyor belts 22, 24 moved at the same conveyance speed as the pair of conveyor belts 14, 16, so that further rotation of the workpiece 40 is prevented. This conveyance position is indicated by the workpiece 40 in FIG. 1, which is clamped at the pivoting point 4.

It follows from the operation described that the workpiece need not necessarily be rotated through 90°. Rotational positions may also be obtained wherein the workpiece has been rotated relative to its initial position through an angle greater or smaller than 90°. The corresponding desired position can be obtained in a particularly simple manner by the concurrently moving carrier belts.

An alternative for the design of the carrier belts is shown in FIG. 3. In this embodiment, only one moving carrier belt has been provided. However, the lateral distance of this carrier belt from the pair of aligned conveyor belts 14, 16 can be modified in a simple manner depending on the size of the workpiece 40 or 40'.

In the apparatus 10 represented in FIG. 3, all other parts have been embodied in a manner identical to those of the embodiment shown in FIG. 1.

The carrier belt 22 runs below the table 12 and is taken over two guide pulleys 58 and 60 which are each disposed generally parallel to the conveyance plane, that is to say the table 12, when viewed as in FIG. 3, except that as is shown in greater detail in FIG. 3(*b*) that the guide pulleys 58 and 60 can be pivoted relative to the table 12. The arrangement of (i) the stops 26 on the belt and (ii) the conveyance plane of the table 12 is such that, depending on the pivotal position of the guide pulleys about their spindle suspension axis 62, the stops 26 circulating with the carrier belt 22 always project upwardly beyond that one of the two slots in the table 12 towards which the guide rollers 58, 60 are inclined (cf. FIG. 3*b*). Thus a simple pivoting of the guide pulleys in their pivoting frame 62, makes it possible to use the other slot and hence to obtain a support for a large workpiece 40 (using the slot further from the belts 14, 16) or a support for a small workpiece 40' using the slot nearer to the belts 14, 16 (cf. FIG. 3).

In accordance with the direction of inclination the carrier belt 22 has to be driven in the direction of arrow a, or the direction of arrow b. For this reason, the guide pulleys are provided with a motor whose direction of rotation can be switched over in a way not shown here in greater detail.

FIG. 3(*a*) shows the pivot suspension of the pivoting frame 62 and of the guide pulley 58.

We claim:

1. An apparatus for rotating workpieces fed in a laid flat position, comprising:

a pair of conveyor belts which fix a workpiece eccentrically at a fixed point and move it forward;

at least one carrier belt that runs parallel to the pair of conveyor belts; and at least one suction belt between the pair of conveyor belts and the at least one carrier belt, for suctionally attracting a part of the workpiece that is spaced from said one fixed point.

2. An apparatus according to claim 1, comprising two suction belts disposed one after the other in a conveyance direction of the workpiece.

3. An apparatus according to claim 1, further comprising a single conveyor belt arranged ahead of the at least one suction belt in an intake zone of the apparatus.

4. An apparatus according to claim 1, wherein the at least one suction belt consists of an endless conveyor belt whose upper side runs sealed above a vacuum suction reservoir, and comprises suction holes arranged at intervals along the endless conveyor belt.

5. An apparatus for rotating workpieces fed in a laid flat position, comprising:

a pair of conveyor belts which fix the workpiece eccentrically at one point and move it forward; and at least one carrier belt that runs parallel to the pair of conveyor belts;

wherein said at least one carrier belt runs below a conveyance plane for the workpiece and passes round two guide pulleys which are substantially parallel to the conveyance plane;

wherein spaced stops are provided on the carrier belt; and wherein said guide pulleys are pivoted relative to the conveyance plane in such a way that, depending on a pivotal position of the guide pulleys, the stops on the at least one carrier belt project or do not project from the conveyance plane.

6. An apparatus according to claim 5, wherein the guide pulleys are arranged in a pivoting frame and are pivoted together with each other.

7. An apparatus for rotating workpieces fed in a laid flat position, comprising:

a pair of conveyor belts which fix a workpiece eccentrically at a fixed point and move it forward;

at least one carrier belt that runs parallel to the pair of conveyor belts; and at least one suction belt between the pair of conveyor belts and at least one carrier belt, for suctionally attracting a part of the workpiece that is spaced from said one fixed point, wherein the at least one carrier belt running below the conveyance plane passes round two guide pulleys which are substantially parallel to the conveyance plane;

wherein there are spaced stops provided on the at least one carrier belt; and wherein said guide pulleys are pivoted relative to the conveyance plane in such a way that, depending on the pivotal position of the guide pulleys, the stops on the at least one carrier belt project or do not project from the conveyance plane.

8. An apparatus according to claim 7 wherein two of said suction belts are disposed one after the other in a conveyance direction of the workpiece.

9. An apparatus according to claim 7, further comprising a single conveyor belt arranged ahead of the at least one suction belt in an intake zone of the apparatus.

10. An apparatus according to claim 7, wherein the at least one suction belt consists of an endless conveyor belt whose upper side runs sealed above a vacuum suction reservoir, and comprises suction holes arranged at intervals along the endless conveyor belt.

\* \* \* \* \*